US 9,892,199 B2

(12) United States Patent
Perrin et al.

(10) Patent No.: US 9,892,199 B2
(45) Date of Patent: Feb. 13, 2018

(54) SPECIALIZED VIRTUAL PERSONAL ASSISTANT SETUP

(71) Applicant: LENOVO (Singapore) PTE, LTD., New Tech Park (SG)

(72) Inventors: Steven Richard Perrin, Raleigh, NC (US); Matthew Lloyd Hagenbuch, Durham, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 160 days.

(21) Appl. No.: 14/137,412

(22) Filed: Dec. 20, 2013

(65) Prior Publication Data

US 2015/0178393 A1 Jun. 25, 2015

(51) Int. Cl.
*G06F 7/00* (2006.01)
*G06F 17/30* (2006.01)
*G06Q 10/00* (2012.01)

(52) U.S. Cl.
CPC .. *G06F 17/30867* (2013.01); *G06F 17/30899* (2013.01); *G06Q 10/00* (2013.01)

(58) Field of Classification Search
CPC ........ G06F 17/30867; G06F 17/30899; G06Q 10/00
USPC ........................................... 707/722
See application file for complete search history.

(56) References Cited

U.S. PATENT DOCUMENTS

| 6,160,629 | A  | * | 12/2000 | Tang ...................... G06K 15/02 358/1.1 |
| 6,396,389 | B1 | * | 5/2002  | Nakano ............... G07C 9/00182 307/10.2 |
| 8,533,761 | B1 | * | 9/2013  | Sahami .............. H04N 5/44543 725/51 |
| 2004/0175047 | A1 | * | 9/2004 | Gormish ............ H04N 7/17318 382/232 |
| 2005/0160061 | A1 | * | 7/2005 | Todd ................. G06F 17/30085 |
| 2005/0278313 | A1 | * | 12/2005 | Plow ................. G06F 17/30864 |
| 2006/0010177 | A1 | * | 1/2006 | Kodama ............... G06F 17/302 |
| 2006/0197379 | A1 | * | 9/2006 | Ueno .................. B60R 25/2036 307/9.1 |
| 2007/0078822 | A1 | * | 4/2007 | Cucerzan .......... G06F 17/30864 |
| 2007/0082707 | A1 | * | 4/2007 | Flynt ..................... G06F 3/0481 455/564 |
| 2009/0112647 | A1 | * | 4/2009 | Volkert ............. G06F 17/30029 705/26.1 |
| 2011/0191857 | A1 | * | 8/2011 | Barker .................. H04W 12/02 726/26 |
| 2012/0016678 | A1 | * | 1/2012 | Gruber ................ G06F 17/3087 704/275 |
| 2012/0173520 | A1 | * | 7/2012 | Wu .................. G06F 17/30867 707/723 |

(Continued)

*Primary Examiner* — Kris Mackes
*Assistant Examiner* — Lin Lin Htay
(74) *Attorney, Agent, or Firm* — Kunzler PC

(57) ABSTRACT

An apparatus for setting up a specialized personal electronic assistant on an electronic device includes a processor, a display, a language module, a tracking module, a knowledge module, and a rendering module. The language module interprets a communication from a user into a data request. The tracking module stores the data request as one of a plurality of stored data requests. The knowledge module determines a response to the data request. The rendering module displays the response in a tiled area on an image display of the electronic device.

8 Claims, 6 Drawing Sheets

(56) References Cited

U.S. PATENT DOCUMENTS

| | | | | |
|---|---|---|---|---|
| 2012/0306927 A1* | 12/2012 | Lee | ............... | G06F 3/041 345/660 |
| 2015/0134649 A1* | 5/2015 | Yin | ............... | H04W 4/206 707/723 |
| 2015/0286698 A1* | 10/2015 | Gagnier | ............... | G06F 17/30595 707/736 |

* cited by examiner ional data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

SPECIALIZED VIRTUAL PERSONAL ASSISTANT SETUP

FIELD

The subject matter disclosed herein relates to the creation of specialized virtual personal assistants on an electronic device and more particularly relates to simplified setup of specialized virtual personal assistants through natural language processing.

BACKGROUND

Description of the Related Art

Computers and other electronic devices continue to grow in speed and processing power. Advancements in computer hardware have helped fuel advancements in computer science, including such fields as natural language processing as a form of human-computer interaction. Many operating systems include natural language processing functions that may be leveraged by native or third party software applications. The number of third party software applications for electronic devices (e.g., smartphones, tablet computers, televisions) continues to grow, and a number of these applications have the ability to understand user voice commands through natural language processing. While users can choose from a selection of software applications for many tasks, users typically do not have the expertise to create their own custom software applications.

BRIEF SUMMARY

An apparatus for specialized virtual personal assistant setup is disclosed. The apparatus includes a processor and a memory that stores code executable by the processor. The code includes a language module, a tracking module, a knowledge module, and a rendering module. The language module interprets a communication from a user into a data request. The tracking module stores the data request as one of a plurality of stored data requests. The knowledge module determines a response to the data request. The rendering module displays the response in a tiled area on an image display of an electronic device. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
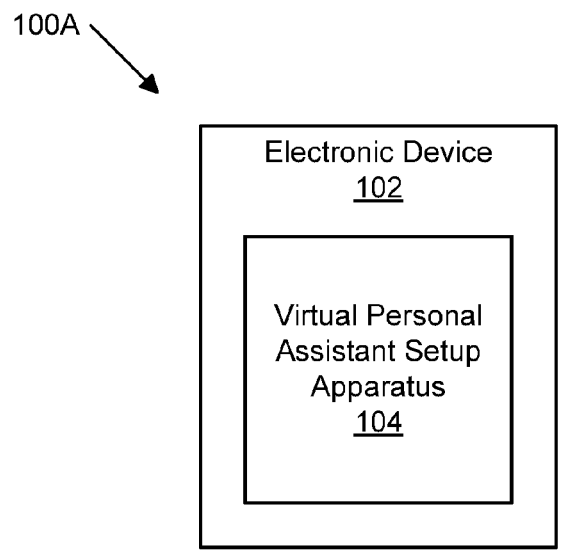
FIG. 1A is a schematic block diagram illustrating one embodiment of a system for setting up a specialized personal assistant on an electronic device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1A is a schematic block diagram illustrating one embodiment of a system 100A for setting up a specialized personal assistant on an electronic device. The system 100A includes an electronic device 102 having a virtual personal assistant setup apparatus 104, which are described below.

The system 100A includes an electronic device 102 that sets up a specialized personal assistant for a user using a virtual personal assistant setup apparatus 104. The electronic device 102 may be any electronic device with an electronic display and the ability to receive communication from a user. For example, the electronic device 102 may be a desktop computer, laptop computer, tablet computer, television, smartphone, or projector. The electronic device 102 may receive a communication from a user through various input methods, including but not limited to a keyboard, mouse, stylus, touch surface, camera, or microphone. The virtual personal assistant setup apparatus 104 resides on the electronic device 102.

Figure 1B:
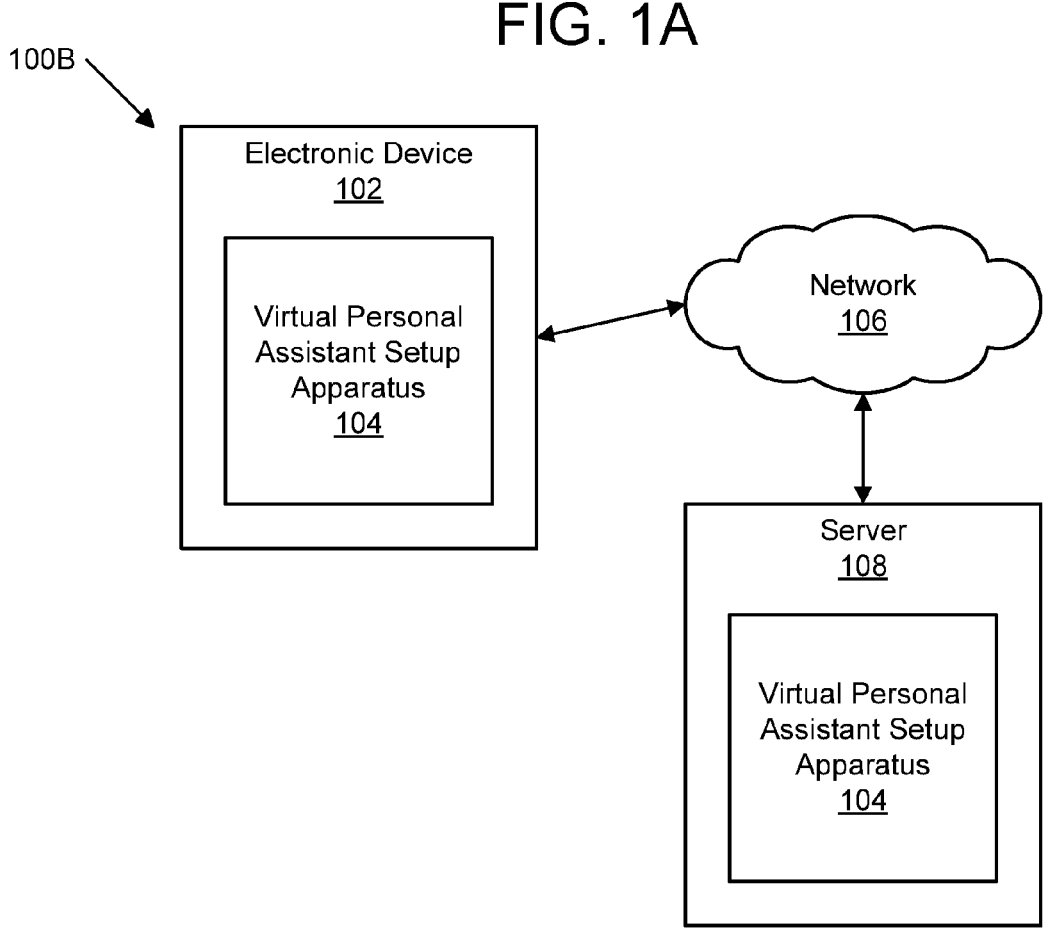
FIG. 1B is a schematic block diagram illustrating another embodiment of a system for setting up a specialized personal assistant on an electronic device.

FIG. 1B is a schematic block diagram illustrating another embodiment of a system 100B for setting up a specialized personal assistant on an electronic device. The system 100B includes another embodiment of an electronic device 102 having a portion of a virtual personal assistant setup apparatus 104, a network 106, and a server 108 also having a portion of the virtual personal assistant setup apparatus 104. The electronic device 102 is substantially similar to the electronic device 102 described above in relation to system 100A in FIG. 1. The virtual personal assistant setup apparatus 104, network 106, and server 108 are described further below.

The virtual personal assistant setup apparatus 104 resides in part on the electronic device 102 and in part on the server 108. The virtual personal assistant setup apparatus 104 receives communications from a user via the electronic device 102. The virtual personal assistant setup apparatus 104 is described in more detail with respect to the apparatus 200 in FIG. 2. The network 106 connecting the server 108 and the electronic device 102 may include a local area network ("LAN"), a wide area network ("WAN"), a wireless network, a cellular network, the Internet, or the like. The server 108 may be any computer accessible by a computing device 106 over a network 108, including but not limited to a mainframe server.

Figure 2:
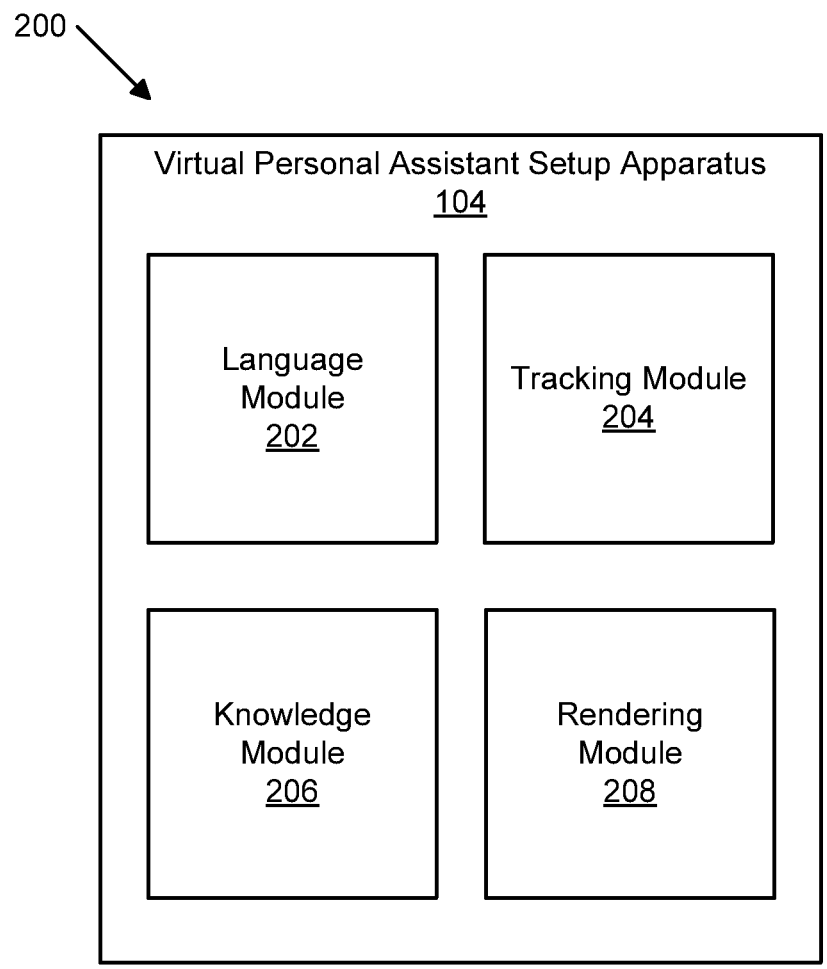
FIG. 2 is a schematic block diagram illustrating one embodiment of an apparatus for setting up a specialized personal assistant on an electronic device.

FIG. 2 is a schematic block diagram illustrating one embodiment of an apparatus 200 for setting up a specialized personal assistant on an electronic device. The apparatus 200 includes one embodiment of a virtual personal assistant setup apparatus 104 with a language module 202, tracking module 204, knowledge module 206, and rendering module 208, which are described below.

The language module 202 interprets communication from a user into a data request. The communication from the user may be in different forms. In one embodiment, the communication may consist of written text. In another embodiment, the communication may consist of audio, such as spoken words or a series of sounds. In yet another embodiment, the communication may consist of hand and/or body gestures. In still another embodiment, the communication may consist of video. The communication from the user can have different purposes. In one embodiment, the communication may be declarative (e.g., "I am hungry."). In certain embodiments, the communication may be interrogative (e.g., "What is the current temperature in New York City?"). In other embodiments, the communication may be exclamatory (e.g., "I have a flat tire!"). In another embodiment, the communication may be imperative (e.g., "Find me the fastest route to the airport."). The language module 202 uses natural language processing to understand the meaning of the communication from the user and translate the communication into a data request. For example, the language module 202 can translate the communication "I am hungry" into a request for the nearest dining options for the user, such as the restaurants within a one-block radius of the user and/or the contents of the user's refrigerator. As another example, the language module 202 can translate the communication "I have a flat tire!" as a request for the contact information of local towing companies and/or a taxi service. As yet another example, the language module 202 can translate the communication "Find me the fastest route to the airport" as a request to supply turn-by-turn navigation instructions from the user's current location to the nearest airport.

The tracking module 204 stores the data request translated from the communication as one of a plurality of stored data requests. The tracking module 204 stores the data request in a database or other storage format so that it can be compared to subsequent data requests to determine if the data request is related to a subsequent data request. In one embodiment, the data request is stored for a predetermined amount of time. Sometimes, the predetermined amount of time is defined within the data request. For example, the data request associated with the communication "When is my dentist appointment today?" would be stored until the appointment time has passed. In another embodiment, the data request is stored until the user deletes the data request. In yet another embodiment, the data request is stored until the user deletes a response associated with the data request. In still another embodiment, the data request is stored until there is no more capacity to store new data requests. In this scenario, the oldest stored data request is deleted.

The knowledge module 206 determines a response to the data request. In one embodiment, the knowledge module 206 determines the response by searching one or more data sources on the electronic device 102 for the requested data. For example, given a data request associated with the communication "When is my dentist appointment today?" the knowledge module 206 may search the user's appointment calendar stored on the electronic device 102. In another embodiment, the knowledge module 206 determines the response by searching one or more data sources on one or more servers 108 connected to the electronic device 102 through a network 106. As an example, given a data request associated with the communication "I need to get to an emergency room now!" the knowledge module may search one or more online mapping services to find the nearest hospital.

In some embodiments, the knowledge module 206 determines an updated response to the data request if it determines that the data request is a recurring data request. An example of a recurring data request is a data request associated with the communication "What is the current stock price for Microsoft?" In response to a recurring data request, the knowledge module 206 conducts a search for the response and then sets up a schedule to repeat the search one or more times to determine the updated response. In one instance, the knowledge module 206 may set the schedule automatically. In another instance, the user may specify the schedule to be followed by the knowledge module 206 in determining the updated response to the recurring data request.

The knowledge module 206 may determine the response to the data request in the context of one of the plurality of stored data requests. In one embodiment, the knowledge module 206 may determine the response to the data request in the context of a stored data request immediately preceding the current data request. For example, the knowledge module 206 may receive two consecutive data requests corresponding to the communications "What is the date for Labor Day this year?" and "What is the average temperature on that date in New Orleans?" In this example, the knowledge module 206 determines the response to the second communication "What is the average temperature on that date?" in the context of the preceding data request to search for and average the history weather temperatures in New Orleans on a particular date. In another embodiment, the knowledge module 206 may determine the response to the data request in the context of a stored data request determined to be related to the current data request. For example, given a current data request associated with the communication "Show me a list of the nearest movie theaters" that is related to a stored data request associated with the communication "Which movie sold the most tickets last week?" the knowledge module 206 may search for the nearest movie theaters showing the movie that sold the most tickets last week and omit movie theaters not showing that movie.

The rendering module 208 displays the response from the knowledge module 206 in a tiled area on an image display of the electronic device 102. The image display of the electronic device 102 may be a screen of the electronic device 102, a two dimensional projection on a flat surface (e.g., table, wall) generated by the electronic device 102, or a three dimensional projection generated by the electronic device 102. The tiled area on the image display of the electronic device 102 contains one or more polygonal shaped spaces containing a combination of text, symbols, images, and/or video. In one embodiment, the rendering module 208 displays the response in a single tile within the tiled area of the image display. In another embodiment, the rendering module 208 displays the response across multiple tiles within the tiled area of the image display. In some embodiments, the rendering module 208 displays the response with one or more responses within a single tile within the tiled area of the image display. In other embodiments, the rendering module 208 displays the response with one or more other responses within multiple tiles within the tiled area of the image display. In still another embodiment, the rendering module 208 displays the response in one or more tiles persistently until the user deletes the response or the one or more tiles.

In certain embodiments, the rendering module 208 updates one or more existing tiles containing an existing response corresponding to a stored data request with the response to the data request in response to a determination that the data request is related to the stored data request. In one embodiment, the rendering module 208 replaces the existing response within the one or more existing tiles with the update response. In another embodiment, the rendering module 208 supplements the existing response within the one or more existing tiles with the updated response. For example, given consecutive data requests corresponding to the communications "What is the current temperature in Charlotte, N.C.?" and "What is the humidity level there?" the rendering module 208 would first format and display the response to the first data request (i.e., current temperature) in a tile within the tiled area and then update the tile to also show the response to the second data request (i.e., current humidity).

Figure 3:
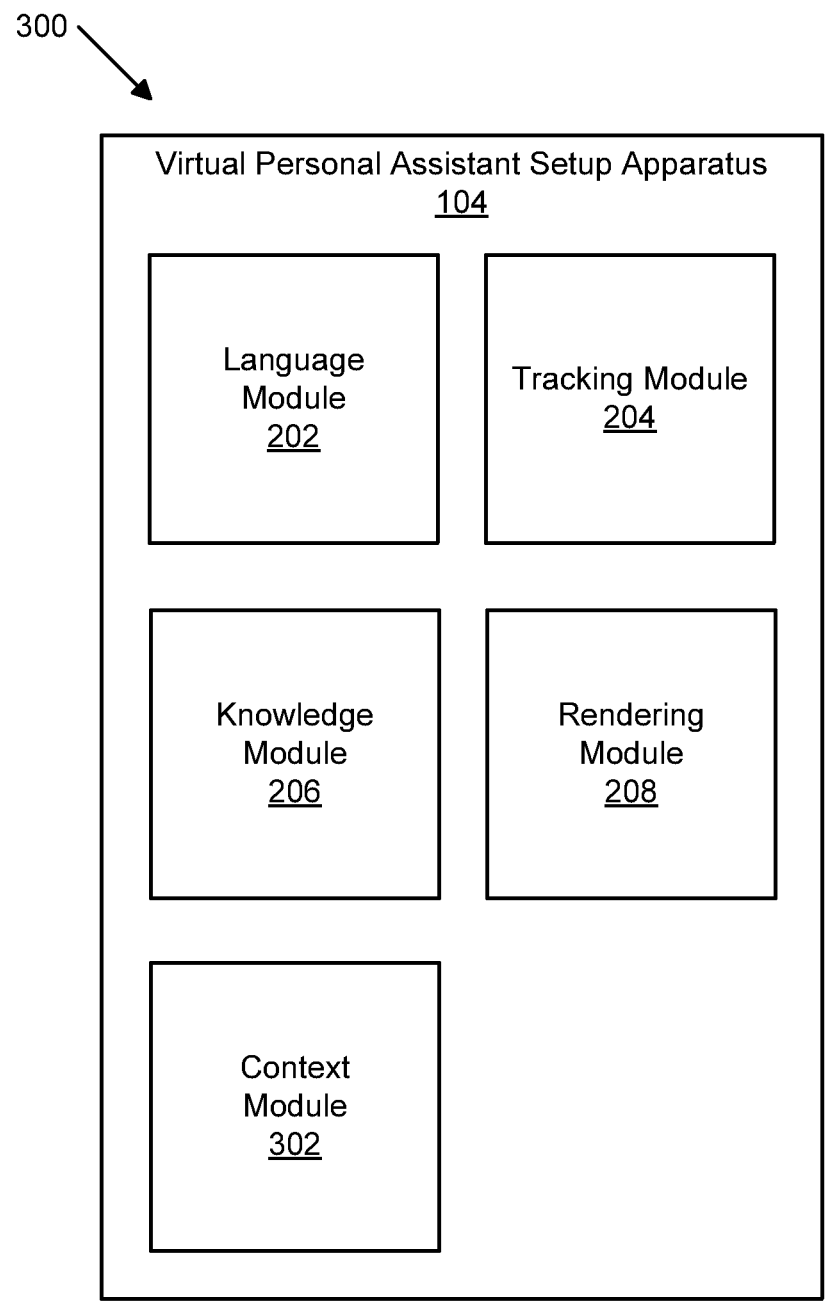
FIG. 3 is a schematic block diagram illustrating another embodiment of an apparatus for setting up a specialized personal assistant on an electronic device.

FIG. 3 is a schematic block diagram illustrating another embodiment of an apparatus 300 for setting up a specialized personal assistant on an electronic device. The apparatus 300 includes another embodiment of a virtual personal assistant setup apparatus 104 with a language module 202, tracking module 204, knowledge module 206, and rendering module 208, which are substantially similar to those described above in relation to apparatus 200 in FIG. 2. The apparatus also includes a context module 302, described below.

The context module 302 compares a data request to stored data requests to determine whether the data request is related to one of the stored data requests. In one embodiment, the context module 302 compares the data request to the stored data request immediately preceding the data request to determine whether the data request is related to a stored data request. In another embodiment, the context module 302 compares the data request to a predetermined number of stored data requests immediately preceding the data request (e.g., the last five stored data requests). In yet another embodiment, the context module 302 compares the data request to a number of stored data requests stored within a predetermined amount of time (e.g., data requests stored within the last 15 minutes). In still another embodiment, the context module 302 compares the data request to each data request of the plurality of stored data requests to determine whether the data request is related to a stored data request.

Figure 4:
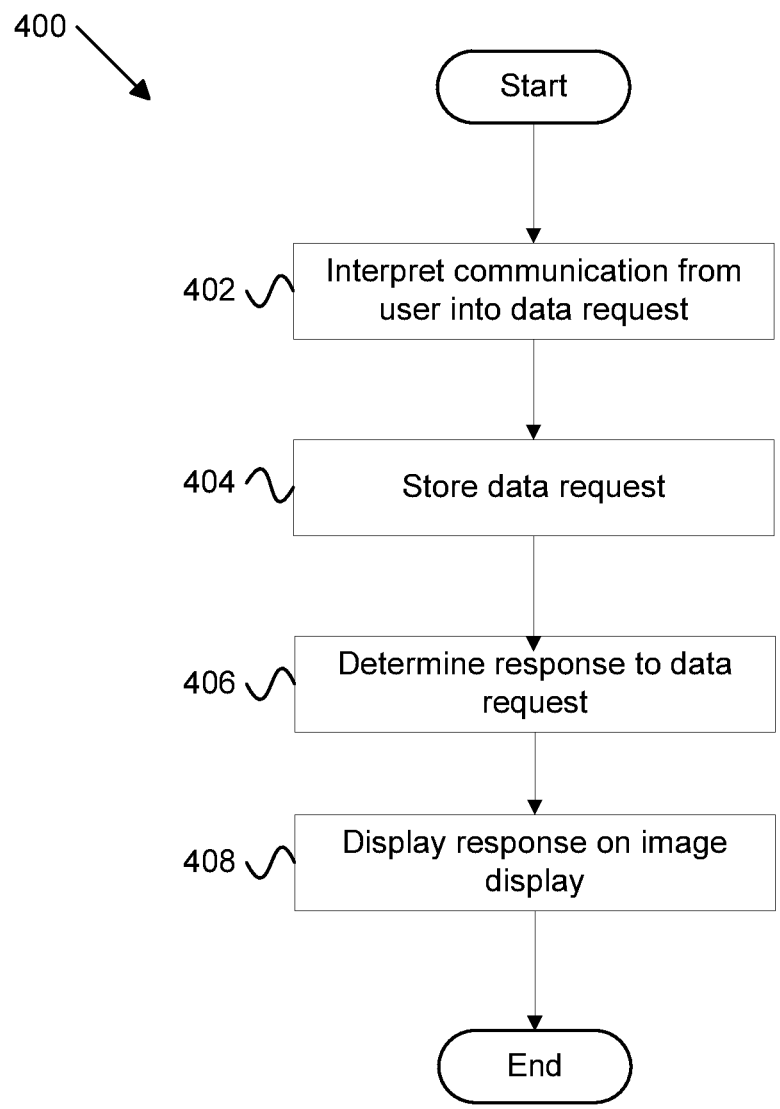
FIG. 4 is a schematic flow chart diagram illustrating one embodiment of a method for setting up a specialized personal assistant on an electronic device.

FIG. 4 is a schematic flow chart diagram illustrating one embodiment of a method 400 for setting up a specialized personal assistant on an electronic device. The method 400 begins and interprets 402 a communication from a user into a data request. The method 400 stores 404 the data request as one of a plurality of stored data requests. The method 400 determines 406 a response to the data request. In one embodiment, the method 400 determines 406 a response to the data request by searching one or more data sources for the requested data. The method 400 displays 408 the response in a tiled area on an image display of an electronic device and the method 400 ends. In one embodiment, the method 400 displays 408 the response in a single tile within the tiled area of the image display. In another embodiment, the method 400 displays 408 the response across multiple tiles within the tiled area of the image display. In some embodiments, the method 400 displays 408 the response with one or more responses within a single tile within the tiled area of the image display. In other embodiments, the method 400 displays 408 the response with one or more other responses within multiple tiles within the tiled area of the image display. In still another embodiment, the method 400 displays 408 the response in one or more tiles persistently until the user deletes the response or the one or more tiles.

Figure 5:
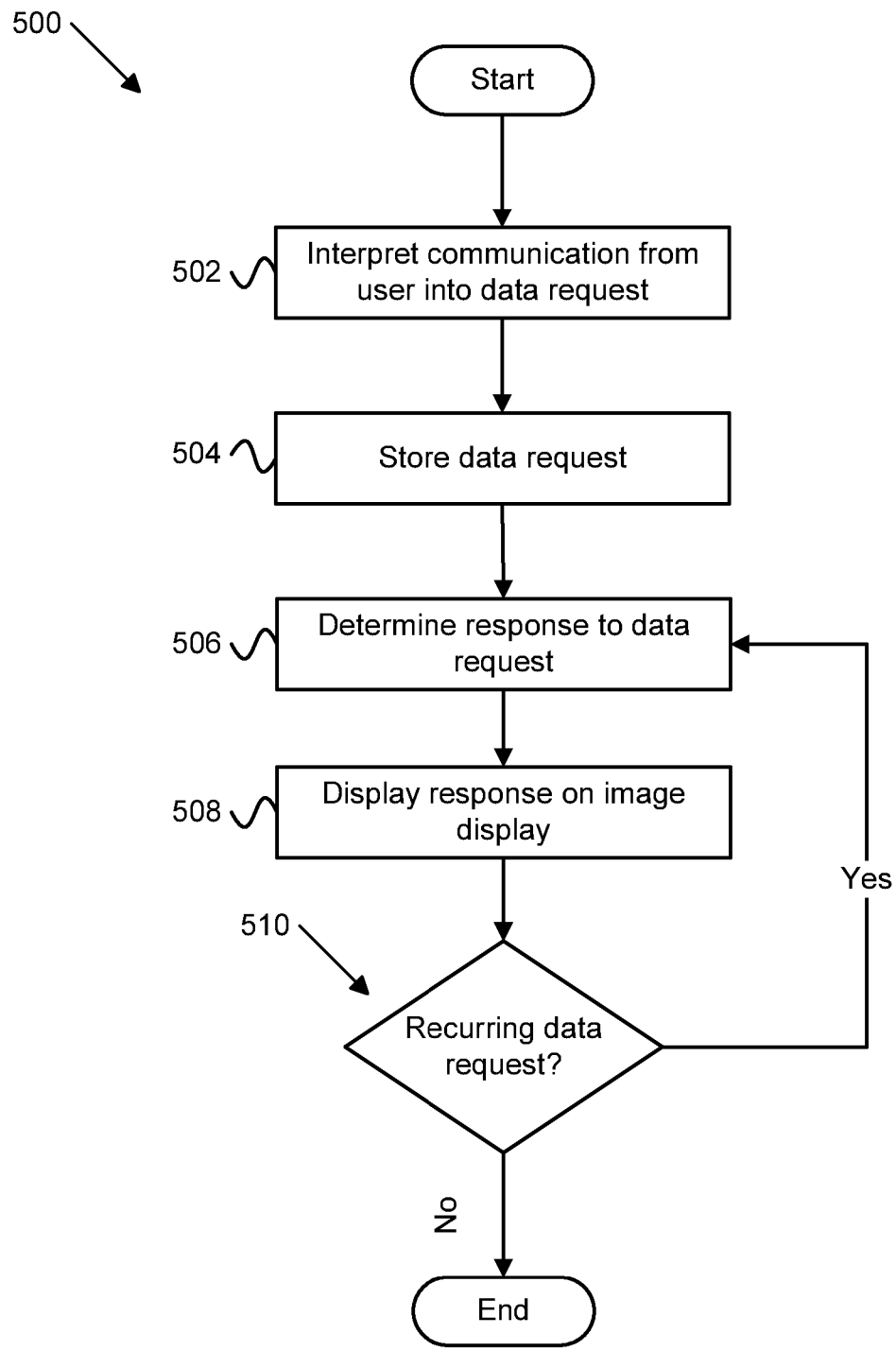
FIG. 5 is a schematic flow chart diagram illustrating another embodiment of a method for setting up a specialized personal assistant on an electronic device.

FIG. 5 is a schematic flow chart diagram illustrating another embodiment of a method for setting up a specialized personal assistant on an electronic device. The method 500 begins and interprets 502 a communication from a user into a data request. The method 500 stores 504 the data request as one of a plurality of stored data requests. The method 500 determines 506 a response to the data request. In one embodiment, the method 500 determines 506 a response to the data request by searching one or more data sources for the requested data. The method 500 displays 508 the response in a tiled area on an image display of an electronic device. The method 500 determines 510 whether the data request is a recurring data request. If the data request is a recurring data request, the method 500 once again determines 506 a response to the data request and displays 508 the response. If the data request is not a recurring data request, the method 500 ends.

Figure 6:
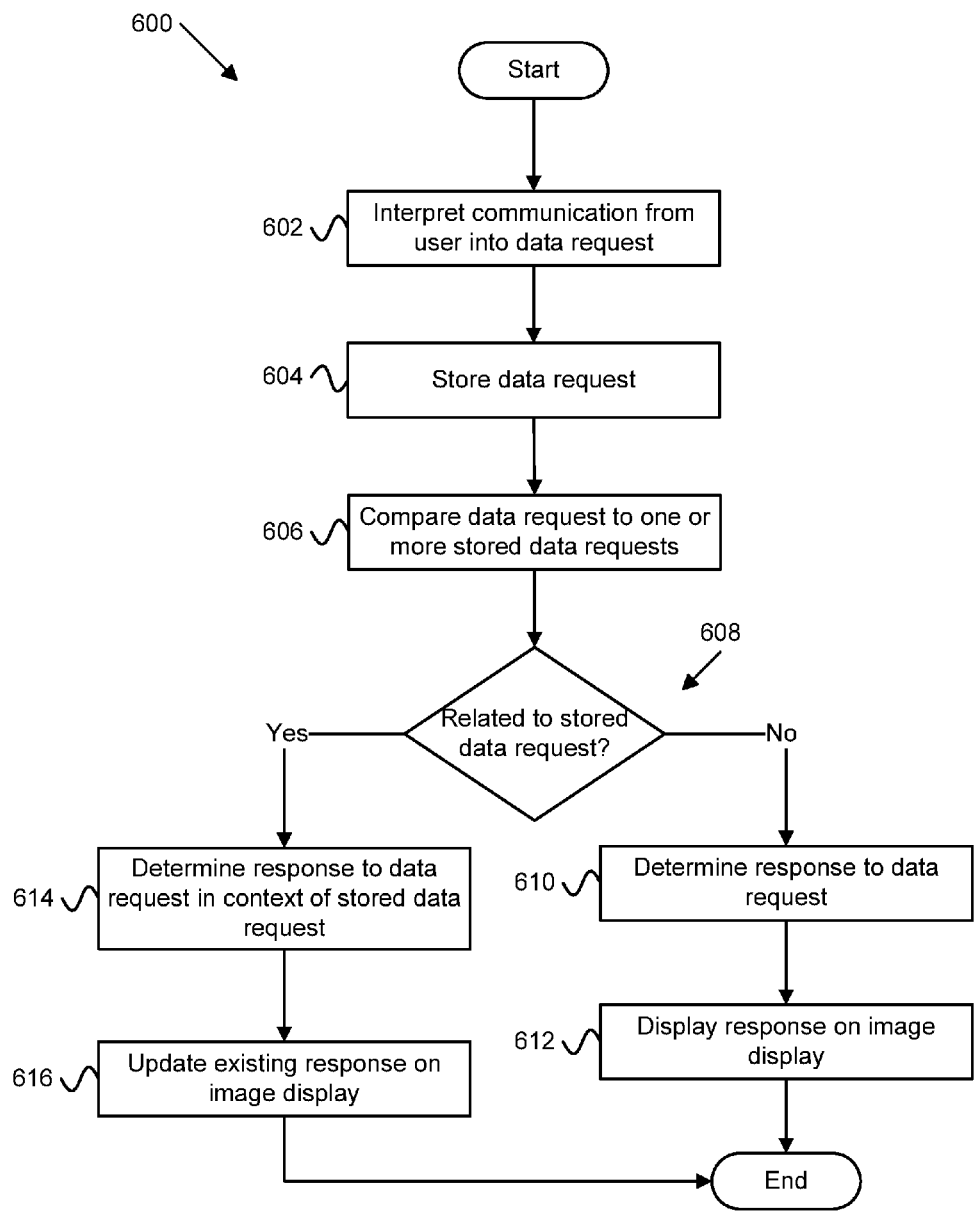
FIG. 6 is a schematic flow chart diagram illustrating still another embodiment of a method for setting up a specialized personal assistant on an electronic device.

FIG. 6 is a schematic flow chart diagram illustrating still another embodiment of a method for setting up a specialized personal assistant on an electronic device. The method 600 begins and interprets 602 a communication from a user into a data request. The method 600 stores 604 the data request as one of a plurality of stored data requests. The method 600 compares 606 the data request to one or more stored data requests to determine if the data request is related to a stored data request. In one embodiment, the method 600 compares 606 the data request to the stored data request immediately preceding the data request. In another embodiment, the method 600 compares 606 the data request to a predetermined number of stored data requests immediately preceding the data request (e.g., the last five stored data requests). In still another embodiment, the method 600 compares 606 the data request to a number of stored data requests stored within a predetermined amount of time (e.g., within the past 15 minutes). In yet another embodiment, the method 600 compares 606 the data request to each data request of the plurality of stored data requests.

The method 600 determines 608 whether the data request is related to a stored data request. If the data request is not related to a stored data request, the method 600 determines 610 the response to the data request. In one embodiment, the method 600 determines 610 a response to the data request by searching one or more data sources for the requested data. The method 600 displays 612 the response in a tiled area on an image display of an electronic device and the method 600 ends. If the data request is related to a stored data request, the method 600 determines 614 the response to the data request in the context of the stored data request. The method 600 updates 616 one or more existing tiles containing an existing response corresponding to the related stored data request with the response and the method 600 ends. In one embodiment, the method 600 updates 616 the one or more existing tiles by replacing its existing response with the updated response. In another embodiment, the method 600 updates 616 the one or more existing tiles by supplementing its existing response with the updated response.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a display operatively coupled to the processor;
a memory that stores code executable by the processor to:
interpret a first communication from a user into a first data request;
identify one of: an event and a period of time described by the first data request;
store the first data request as one of a plurality of stored data requests, wherein the first data request is stored until expiration of the event or period of time described by the first data request;
determine a first response to the first data request; and
display the first response using a first data request tile in a tiled area comprising a plurality of data request tiles of a virtual personal assistant on the display;
interpret a second communication from the user into a second data request;
determine whether the second data request is related to the first data request in response to the second communication occurring prior to expiration of the event or period of time described by the first data request;
determine a second response to the second data request, wherein determining a second response to the second data request comprises determining in the context of the first data request in response to determining that the second data request is related to the first data request; and
update the first data request tile to also include the second response in response to determining that the second data request is related to the first data request.

2. The apparatus of claim 1, wherein determining the first response to the first data request comprises the processor searching one or more data sources for the requested data.

3. The apparatus of claim 1, wherein the processor further displays the second response using a second data request tile in the tiled area in response to the second data request not being related to the first data request, the second data request tile being separate from the first data request tile.

4. A method comprising:
interpreting, by use of a processor, a first communication from a user into a first data request;
identifying one of: an event and a period of time described by the first data request;
storing the first data request as one of a plurality of stored data requests, wherein the first data request is stored until expiration of the event or period of time described by the first data request;
determining a first response to the first data request;
displaying the first response using a first data request tile in a tiled area on an image display of a virtual personal assistant of an electronic device;
interpreting a second communication from the user into a second data request;
determining whether the second data request is related to the first data request in response to the second communication occurring prior to expiration of the event or period of time described by the first data request;
determining a second response to the second data request, wherein determining a second response to the second data request comprises determining in the context of the first data request in response to determining that the second data request is related to the first data request; and
updating the first data request tile to also include the second response in response to determining that the second data request is related to the first data request.

5. The method of claim 4, wherein determining the first response to the first data request comprises searching one or more data sources for the requested data.

6. The method of claim 4, further comprising displaying the second response using a second data request tile in the tiled area in response to the second data request not being related to the first data request, the second data request tile being separate from the first data request tile.

7. A program product comprising a non-transitory computer readable storage medium storing code executable by a processor to perform:

interpreting a first communication from a user into a first data request;

identify one of: an event and a period of time included in the first communication;

storing the first data request as one of a plurality of stored data requests, wherein the first data request is stored until expiration of the event or period of time included in the first communication;

determining a first response to the first data request; and displaying the first response using a first data request tile in a tiled area on an image display of a virtual personal assistant of an electronic device;

interpreting a second communication from the user into a second data request;

determining whether the second data request is related to the first data request in response to the second communication occurring prior to expiration of the event or period of time included in the first communication;

determining a second response to the second data request, wherein determining a second response to the second data request comprises determining in the context of the first data request in response to determining that the second data request is related to the first data request; and updating the first data request tile to also include the second response in response to determining that the second data request is related to the first data request.

8. The program product of claim 7, further storing code executable by a processor to perform:

displaying the second response using a second data request tile in the tiled area in response to the second data request not being related to the first data request, the second data request tile being separate from the first data request tile.

* * * * *